CIRCUIT FOR DETECTION OF SINE AND COSINE PULSES

Filed June 12, 1967 3 Sheets-Sheet 1

INVENTORS
HENNING F. HARMUTH
DAVID J. NOWAK
PIERRE E. SCHMID

BY Arthur H. Seidel

ATTORNEY

INVENTORS
HENNING F. HARMUTH
DAVID J. NOWAK
PIERRE E. SCHMID

BY Arthur H. Seidel
ATTORNEY

INVENTORS
HENNING F. HARMUTH
DAVID J. NOWAK
PIERRE E. SCHMID

BY Arthur H. Seidel

ATTORNEY

United States Patent Office 3,518,557

Patented June 30, 1970

3,518,557
CIRCUIT FOR DETECTION OF SINE AND COSINE PULSES

Henning F. Harmuth, Leopoldshafen, near Karlsruhe, Austria, and David J. Nowak, West Allis, and Pierre E. Schmid, Whitefish Bay, Wis., assignors to Allen-Bradley Company, Milwaukee, Wis., a corporation of Wisconsin Filed June 12, 1967, Ser. No. 645,447
Int. Cl. H03b *27/00*
U.S. Cl. 328—139 5 Claims

ABSTRACT OF THE DISCLOSURE

A circuit for detecting the polarity or presence of orthogonal sine and cosine pulses superimposed on one another that includes a number of similar detector circuits, each detector circuit having: an electronic adder that combines an incoming signal with a feedback signal, a first electronic integrator joined to the output of the electronic adder which produces a signal output when cosine pulses to be detected are present, a second electronic integrator connected to the output of the first electronic integrator which produces a signal output when sine pulses to be detected are present, and a feedback from the output of the second electronic integrator to the electronic adder for combining a feedback signal with the incoming signal as aforesaid. The disclosure also shows the relation of control circuits to the detector circuits for sampling the output signals and synchronizsng the detector circuits with the pulses of incoming sine and cosine information.

BACKGROUND OF THE INVENTION

Figure 1:
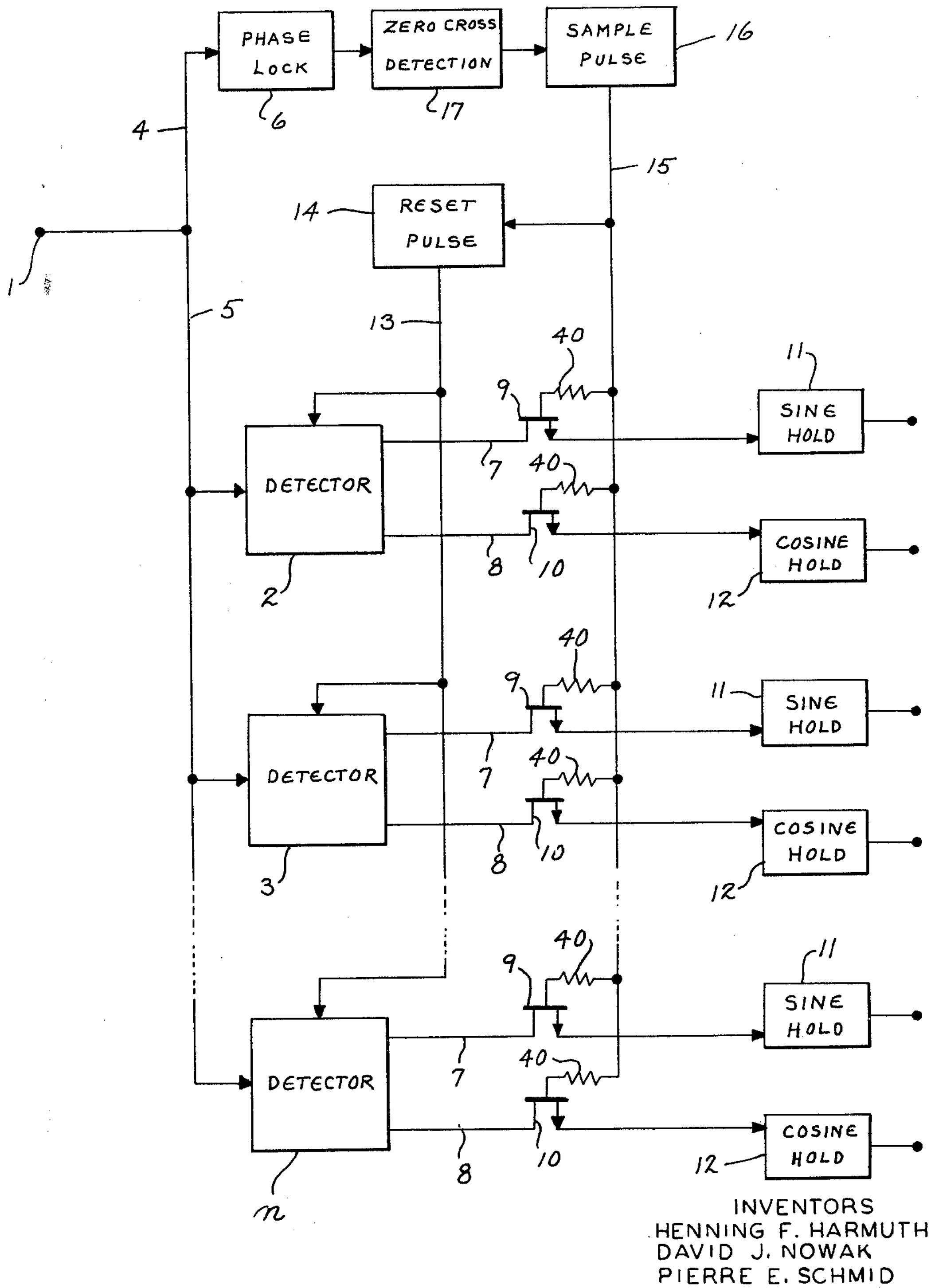

This invention relates to the detection of orthogonal sine and cosine pulses that may be superimposed on one another and transmitted simultaneously over a common transmission medium, or which may be transmitted sequentially in some programmed manner. In usual systems, each sine and cosine pulse provides a bit of digital information ("bit" is a term in digital computer technology meaning one of the two whole numbers in the binary scale). The presence of a particular sine or cosine pulse indicates one of the whole binary numbers, and a phase or amplitude reversal indicates the other binary number.

The transmission of orthogonal sine and cosine pulses for conveying digital information has been suggested, together with designs for both transmission and receiving equipment. The application of such systems has, however, been limited, one reason being that there have been difficulties in the design of satisfactory detection circuits for the receiving equipment. One form of detection heretofore suggested is the provision of a circuit for each sine and cosine pulse in which a pulse identical to the function to be detected is generated and fed to a multiplier circuit receiving the incoming function. The resultant signal is then fed to an integrator circuit that develops an output signal indicative of the presence or absence of the sine or cosine function to be detected. This system utilizes cross-correlation as a basis for detection, and a difficulty with such a system is the necessity of multiplier circuits of great accuracy and large dynamic range. The synchronization of several generators is another difficult problem in this type of detection circuit.

Another approach to detection of orthogonal sine and cosine pulses has involved the use of circuits relying on inductive quantities. The size of inductive circuit components limits the lower end of the range of frequencies for the pulses of information, and losses in inductive compounds also create inaccuracies. A still further approach is to employ filters with mechanical resonators, but this has limitations when miniaturization is a goal. It is a primary purpose of the present invention to provide an improved means of detection overcoming the difficulties of such systems heretofore suggested.

SUMMARY OF THE INVENTION

The invention relates to a detector circuit for sensing the presence of sine or cosine functions received in short pulses, and it resides in a set of three cascaded amplifier circuits, the first amplifier circuit receiving a feedback signal and functioning as an inverter, the other two operating as electronic integrating circuits that provide output signals which indicate the presence or absence of functions to be detected, and the output of the second integrator circuit providing said feedback signal to the first amplifier circuit. In the usual embodiment the incoming sine and cosine pulses comprising bits of digital information are fed to the first amplifier circuit, which then combines the incoming signal with the feedback signal to operate as an electronic adder, and this adder feeds the first integrator circuit. If desired, the incoming signal may, instead, be fed into the detector circuit at some other stage than the input of the adder circuit, which circuit then operates primarily as an inverting amplifier. For either connection of the incoming signals, each integrator circuit operates to provide a significant output signal if the function to be detected is present.

The detector circuit combines resistor and capacitor elements with high gain, operational amplifiers as are commonly employed in analog computer circuits. It is a low loss circuit which gives a high resolution of detection, and it is operable over a wide frequency spectrum, so that a number of detector circuits may be used together to detect a wide range of sine and cosine functions that are super-imposed on one another. There are no inductive elements which limit the frequency range or introduce losses that impair operation. The upper limit of the frequency range of operation is determined by the frequency response of the operational amplifiers employed, and at present may extend to around 100 kHz. The circuit of the invention is also compact, so that apparatus may be housed within a small space. It also eliminates much circuitry necessary in some prior methods of detection, such as generators for developing frequencies matching those to be detected and electronic multipliers of large dynamic range.

THE DRAWINGS

Figure 2:
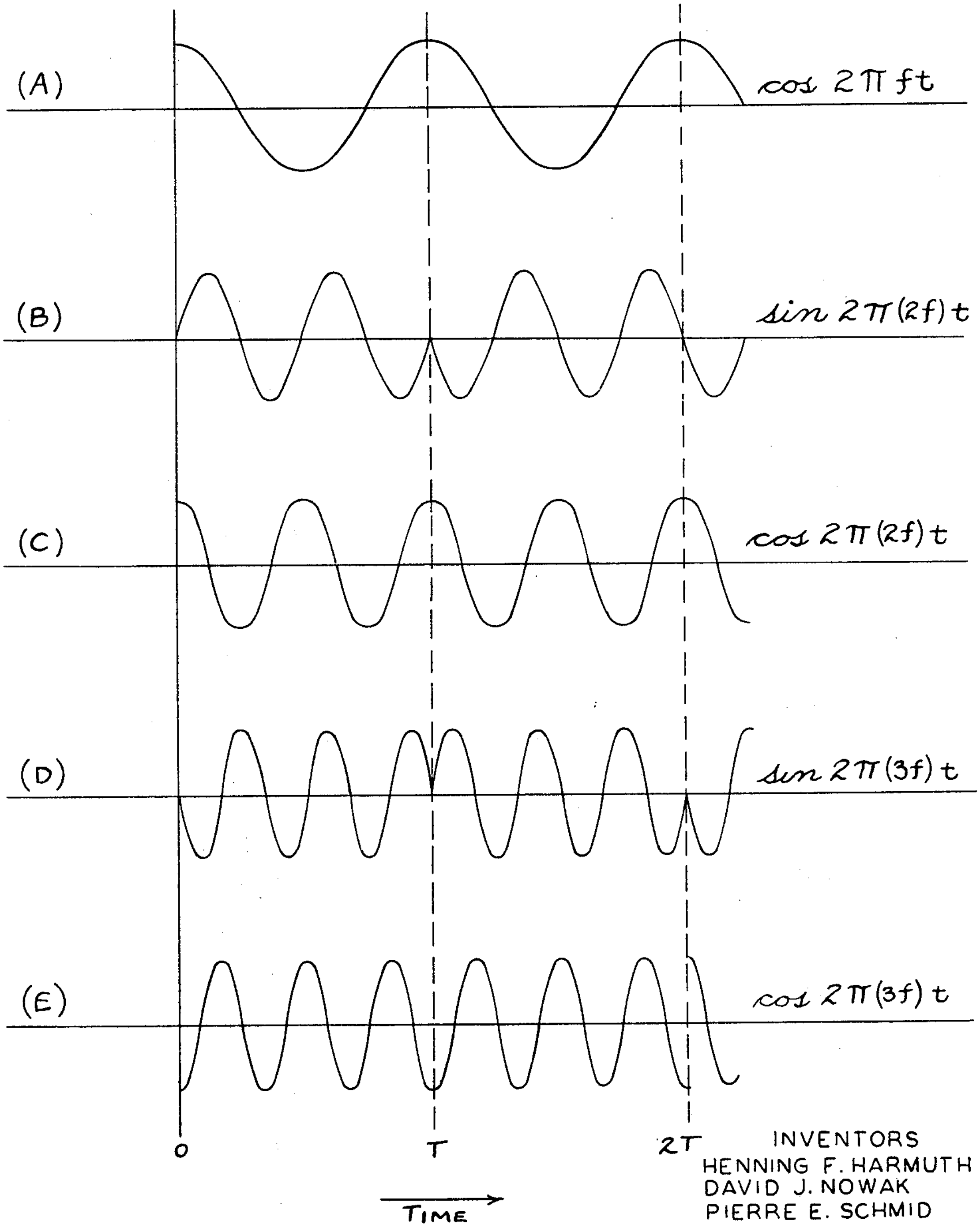
Figure 3:
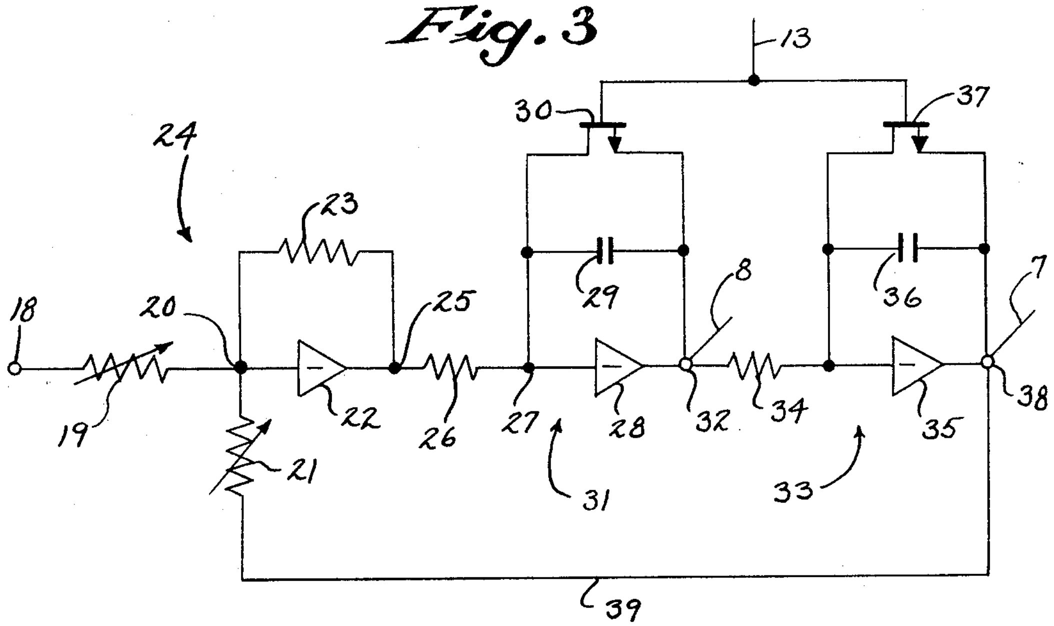

FIG. 1 is a schematic wiring diagram in block form of a detection system embodying detector circuits of the invention, FIG. 2 comprises a set of sine and cosine pulses which illustrate the individual sine and cosine waves that are superimposed upon one another to form a composite signal that is received by apparatus of the invention, FIG. 3 is a schematic wiring diagram of one of several similar detecting circuits that form a part of the circuit of FIG. 1, and FIGS. 4 through 7 are wave forms of output signals derived from a detector circuit as shown in FIG. 3.

DESCRIPTION OF A PREFERRED EMBODIMENT

Referring to the drwings, there is shown in FIG. 1 a schematic diagram of a receiving circuit that detects the presence or absence of each of a plurality of orthogonal sine and cosine functions that have been transmitted to the circuit as a composite signal in which the functions are superimposed on one another. These sine and cosine functions are transmitted as a complex pulse during a brief signalling interval, with each function acting as a bit of digital information. The general purpose is to transmit a set of several bits of digital information in a signalling interval, which is designated herein as an orthogonality interval, and to continue the transmission of information by the sending and receiving of successive orthogonality intervals that follow immediately one after the other. The transmission of a sine, or cosine wave in a particular phase position will represent one of the two whole numbers of a bit of information, and a phase reversal of the wave, or an absence of the wave, will represent the other whole number of the binary information being signalled. A plurality of sine and cosine waves of different frequencies transmitted simultaneously as pulses over a common transmission medium will then comprise an entire set of digital information. It is this type of transmitted information which is fed to the circuit of FIG. 1.

An alternative manner of transmitting the sine and cosine functions, which can also be handled by circuits of the invention, is to transmit only a single sine or cosine pulse in an orthogonality interval. This mode of transmission is useful when there is noise in the system, but for the purpose of explaining a preferred embodiment the transmission of several superimposed sine and cosine functions will be the mode of transmission discussed.

It is necessary for detection purposes that the sine and cosine functions be orthogonal, that is, functions of the same frequency must be displaced by 90°, or odd multiples thereof, and functions of different frequencies must be harmonically related. Hence, the orthogonal sine and cosine functions received by apparatus of the invention are of the relation $\sin 2\pi(nf)t$ and $\cos 2\pi(nf)t$ wherein $n$ is an integer. In the embodiment to be described, for the base frequency of $n=1$ only the cosine wave is transmitted, for the reason this frequency serves as a synchronizing signal upon which the apparatus "locks" to correctly time the operations of the circuits with the received signals. For successive values of $n$ both sine and cosine functions are transmitted, although as will become apparent herein only a single function might be transmitted for each frequency. However, a greater number of bits of information may be processed and detected for a given frequency bandwidth and for a given amount of apparatus by making use of both sine and cosine functions. Hence, in the preferred embodiment described herein each sine and cosine function above the fundamental is continuously transmitted. When it is desired, during an orthogonality interval, to indicate a binary whole number producing a positive response in the detecting circuit the respective sine or cosine function, as the case may be, is transmitted with positive amplitude, i.e. $+\sin 2\pi(nf)t$. If the other binary whole number is to be indicated the function is transmitted during the orthogonality interval in a 180° phase displacement, that is, it is amplitude reversed, i.e. $-\sin 2\pi(nf)t$.

FIG. 2 illustrates the nature of orthogonal sine and cosine functions transmitted in accordance with the foregoing discussion. A first orthogonality interval is represented between the time zero at the time T, and a second orthogonality interval extends between time T and time 2T. Part A of FIG. 2 represents the function $\cos 2\pi ft$ which acts as the synchronizing signal that is continuously transmitted, and each orthogonality interval is for one cycle of this function. Part B of FIG. 2 represents the second harmonic, $\sin 2\pi(2f)t$. This function is also continuously transmitted, and during the first orthogonality interval it is positive to provide a bit of information that is to produce a positive response in the detecting circuits. During the second orthogonality interval there is an amplitude or phase reversal, thus indicating the other whole number of the binary system. The bit of information for the third orthogonality interval, a part of which interval is shown in FIG. 2, is like that of the second orthogonality interval, i.e. $-\sin 2\pi(2f)t$. Part C of FIG. 2 illustrates the function $\cos 2\pi(f)t$, and here again the function is positive during the first orthogonality interval to produce a positive response in the detection circuit, i.e. $+\cos 2\pi(f)t$. This positive amplitude has been continued into the second orthogonality interval, thereby transmitting the same bit of information for two intervals. Part D of FIG. 2 illustrates the sine of the next harmonic, and it is negative, i.e. $-\sin 2\pi(3f)t$, to indicate to the detector circuit that there is to be a negative response. For the second orthogonality interval in Part D, a phase reversal has been made, so that the other whole number of a binary system is indicated. Part E of FIG. 2 represents the function $\cos 2\pi(3f)t$, and like all the other functions it is continuously transmitted. For both the first and second orthogonality intervals this function is negative, so that the bits of information indicate that there should be a negative response in the detector circuit for both intervals. The few functions shown in FIG. 2 are illustrative only, for the total number of sine and cosine functions that can be handled in an embodiment of the invention can be quite numerous. The circuit of the invention is comprised of precision RC networks together with operational amplifiers, and the fundamental frequency of Part A of FIG. 2 may be as low as a fraction of a Hertz. The upper frequency limit for the highest harmonic depends primarily upon the gain of the amplifiers employed, and presently should be of the order of 100 kHz.

Referring back to FIG. 1, an input terminal 1 receives the composite signal of digital information and through leads 4 and 5 conducts the incoming signal to a phase lock filter 6 and a set of similar detector circuits 2, 3 . . . *n*. Each detector circuit 2, 3 . . . *n* has two output leads 7 and 8 which extend to field effect transistors 9 and 10 that operate as switches for feeding output information to a sine holding circuit 11 and a cosine holding circuit 12. Each detector circuit 2, 3 . . . *n* is also connected to a common control lead 13 that conducts a resetting signal from a reset pulse generator 14. The reset pulse generator 14 is, in turn, controlled through a control lead 15 by a sampling pulse generator 16. The lead 15 also connects the sampling pulse generator 16 to the gates of the transistors 9, 10, and each of these gates is isolated by a series resistor 40. The sampling pulse generator 16 is controlled by a zero crossing detector 17 that is connected to the phase lock filter 6 to complete the circuit of FIG. 1.

One of the individual circuits 2, 3 . . . *n* is shown in FIG. 3. It has an input terminal 18, for connection to the lead 5, that is joined to a variable amplitude resistor 19. The opposite end of the resistor 19 is joined at a summing point 20 with a variable tuning resistor 21, the negative input, or inverting terminal, of an operational amplifier 22 and a feedback resistor 23 that bridges across the amplifier 22. The amplifier 22 and the associated resistors 19, 21 and 23 comprise an electronic adder 24 that operates as a voltage inverter with its output appearing at a junction point 25.

An input resistor 26 is connected at one end to the junction point 25, and at its opposite end it is joined at a summing point 27 in a common connection with the inverting input terminal of an operational amplifier 28 and one side of an integration capacitor 29. The capacitor 29 bridges across the amplifier 28, and a field effect transistor 30 bridges across the capacitor 29. The purpose of the field effect transistor 30 is to serve as a shorting, or clearing switch for discharging the capacitor 29 at the end of an orthogonality interval, and the amplifier 28 together with the input resistor 26 and capacitor 29 comprise a first electronic integrator 31 having its output at a cosine read out junction 32.

The junction 32 feeds a second electronic integrator 33 comprised of an input resistor 34, an operational amplifier 35 and an integration capacitor 36. The resistor 34 is connected to the inverting input terminal of the amplifier 35, and the capacitor 36 bridges across the amplifier 35. A field effect transistor 37 bridges across the capacitor 36 to operate as a clearing switch. The output of the electronic integrator 33 appears at a sine read out junction 38, and from the junction 38 a feedback lead 39 extends back to the variable tuning resistor 21. The two field effect transistors have their gates tied together for connection with the lead 13 from the reset pulse generator 14.

The output of the detector circuit of FIG. 3 appears at the read out junctions 32 and 38. The junction 32 is connected to the associated output lead 8 and it provides a signal at the end of each orthogonality interval that indicates the binary whole number transmitted by the cosine function being detected. The junction 38 connects with the associated output lead 7 and provides a signal at the end of each orthogonality interval that indicates the binary whole number transmitted by the sine function being detected.

Each of the detector circuits 2, 3 . . . *n* operates to detect the sine and cosine pulses of a particular frequency, and that frequency is determined by proper selection of values for the input resistors 26, 34 and the integration capacitors 29, 36. The operation of the circuit of FIG. 3 will be described for the detection of sine and cosine pulses of the frequency $2f$, that is, the circuit is performing as the detector 2 of FIG. 1. In this example, the incoming signal comprises a cosine function of fundamental frequency, as shown in Part A of FIG. 2, and fifteen harmonics above the fundamental, so that fifteen detector circuits are present in the complete apparatus.

Figure 4:
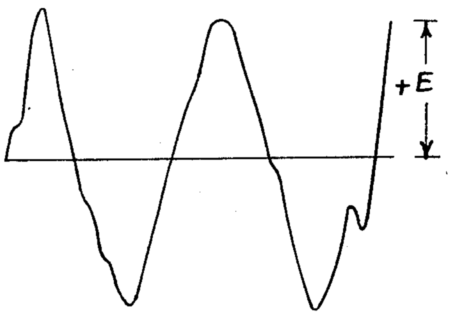

An incoming signal for an orthogonality interval in which both the functions $\sin 2\pi(2f)t$ and $\cos 2\pi(2f)t$ are positive will be assumed, and this is represented in the first orthogonality period of Parts B and C of FIG. 2. The composite signal is then received at the input terminal 18 and at the commencement of the orthogonality interval the integration capacitors 29 and 36 are discharged. The field effect transistors 30 and 37 present a very high impedance, as though they were open switches. The incoming signal is combined with a feedback signal from the lead 39 by the components comprising the electronic adder 24. The operational amplifier 22 of the adder 24 is connected to provide a voltage inversion, and the output of the adder circuit 24 is fed to the electronic integrator 31. The capacitor 29 develops a charge representative of the total area of the curve of the signal delivered to the integrator circuit over the time interval of the orthogonality period, and the wave form of the voltage appearing at the read out junction 32 during this interval is depicted in FIG. 4. As seen, at the termination of the orthogonality interval a positive voltage $+E$ appears, and such positive voltage is an indication of the presence in the transmitted signal of the positive cosine pulse of the frequency $2f$. The wave form of FIG. 4 is that obtained for an input of a fundamental frequency and fifteen sine and cosine harmonics wherein *n* equals 1 through 16. For a different number of functions the wave form would differ, but at the end of the orthogonality interval the voltage $+E$ would still appear.

If the cosine pulse of frequency $2f$ had been phase reversed, that is $-\cos 2\pi(2f)t$, a negative voltage $-E$ would appear at the read out junction 32 at the end of the orthogonality interval. The wave form during the orthogonality interval for such a condition is shown in FIG. 5, and it again was derived from an input signal in which *n* equaled 1 through 16. If the cosine function of frequency $2f$ had been omitted from the incoming signal, then the output voltage at the end of the orthogonality interval would be zero. Thus, the junction 32 is a point in the detection circuit which indicates a bit of information carried by the cosine pulse of frequency $2f$.

Figure 6:
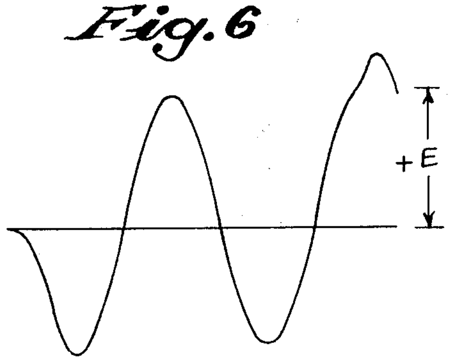
Figure 5:
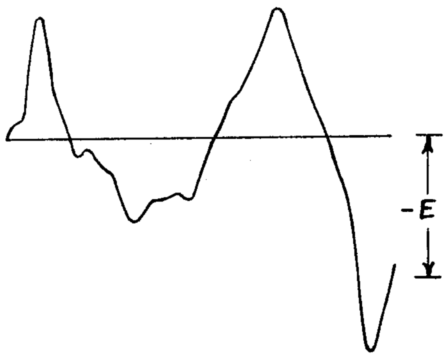
Figure 7:
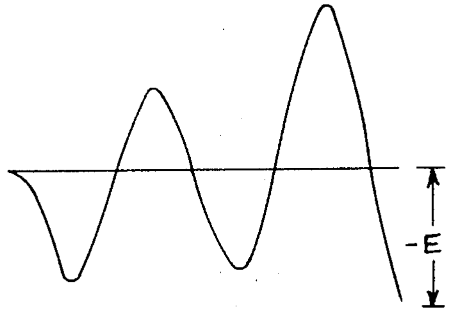

The voltage appearing at the junction 32 is also the input voltage to the electronic integrator 33 comprised of the operational amplifier 35, the input resistor 34, and the capacitor 36. The wave form appearing at the read out junction 38 during the orthogonality interval (in which both the sine and cosine functions of frequency $2f$ are positive) is shown in FIG. 6. At the end of the orthogonality interval there appears a positive voltage $+E$ at the junction 38, which indicates the presence in the transmitted signal of a positive condition for the sine pulse of the frequency being detected. If the sine pulse had been negative, i.e. amplitude or phase reversed, the wave form at the junction 38 would have appeared during the orthogonality interval as shown in FIG. 7. (For FIGS. 6 and 7 the number of functions was *n* equal 1 through 16, as in the case of FIGS. 4 and 5.) Here, a negative voltage $-E$ appears at the end of the orthogonality interval, and such negative voltage would always be present whenever the sine pulse was negative regardless of the phase positions or the number of all other orthogonal sine and cosine pulses comprising the incoming composite signal. Thus, the read out junction 38 provides a voltage at the end of each orthogonality interval that indicates the bit of digital information carried by the sine pulse of the frequency being detected.

If there were no sine function during an orthogonality interval of the frequency to be detected, then the output voltage at the junction 38 would be zero at the end of the orthogonality interval. Thus, it is characteristic at the read out junctions 32, 38 of each detector circuit 2, 3 . . . *n* to have the integral of all the orthogonal sine and cosine functions, other than that which the read out junction is to sense, add up to zero at the end of the orthogonality interval. A sine or cosine pulse of (i) the frequency of detection and (ii) a predetermined phase condition will produce an integration that gives a positive voltage at the respective read out junction 32, 38. A pulse of the same frequency, but opposite phase will give a negative voltage at the junction, and if the sine or cosine function is absent the voltage will be zero. Thus, a bank of detector circuits will analyze an incoming composite signal and reproduce the bits of digital information comprising the signal.

The timing of the operation of each detector circuit 2, 3 . . . *n* must match the successive orthogonality intervals of the transmitted pulses of digital information. For this purpose the phase lock filter 6 is provided together with the zero crossing detector 17 and the pulse generators 14 and 16. The phase lock filter 6 develops a sine wave of frequency $f$ which commences its positive half cycle at the beginning of each orthogonality interval, this being accomplished in the usual manner of combining the output of a voltage controlled oscillator with the incoming signal. The output of the phase lock filter then feeds the zero crossing detector 17, which produces a square wave having a positive going edge synchronized with the commencement and termination of the successive orthogonality intervals.

The sampling pulse generator 16 receives the square wave, and it comprises a monostable multivibrator that is triggered by the positive going edge of the square wave to develop a very short sampling pulse. This sampling pulse is fed through the lead 15 and the isolation resistors 40 to the field effect transistors 9, 10 which then momentarily conduct to connect the leads 7 and 8 of each detector circuit 2, 3 . . . *n* to the associated sine and cosine hold circuits 11 and 12, which may be bistable multivibrators. This momentary conduction through the transistors 9, 10 is at the terminal end of each orthogonality interval, so that the voltages at the junction points 32 and 38 of each detector circuit are read out of the circuit and held for use by associated logic equipment.

The trailing edge of the sampling pulse activates the reset pulse generator 14, which comprises another monostable multivibrator. This transmits a brief pulse through the lead 13 to the field effect transistors 30, 37 of each detector circuit 2, 3 . . . *n*, to cause these transistors to conduct and thereby discharge the integration capacitors 29, 36. The capacitors are thus made ready for the succeeding orthogonality interval.

The switching time in which the pulse generators 14 and 16 trigger the associated transistors to read out information from the detector circuits and discharge the integration capacitors 29, 36 is of such brevity that the time consumed does not create any appreciable loss of resolution in the detection of the orthogonal sine and cosine pulses of the transmitted information. For example, an orthogonality interval may be of the order of 150 milliseconds and the total switching time of the transistors will be of about 100 microseconds. Hence, continuous transmission of data is compatible with switching for reading out information and discharging the capacitors.

The input to the circuit of FIG. 3 comprising the terminal 18 and the resistor 19 may also be connected at other points. For example, the input signal may be fed through a suitable resistor to the summing point 27, or to the similar point in the second integrating circuit 33. When the input is so connected, then the amplifier 22 becomes simply an inverting amplifier, rather than an adding and inverting amplifier.

The circuit of FIG. 3 is described mathematically by the following differential equation:

$$\tau^2\ddot{e}_{38}+2\tau\lambda\dot{e}_{38}+(1+\lambda^2)e_{38}=-(R_{21}/R_{19})e_{18}$$

in which $\tau$ is the time constant given by the relation $RC(R_{21}/R_{23})^{1/2}$, R is the value of resistor 26 or 34, which are preferably of the same value, and C is the value of capacitor 29 or 36, which are preferably of the same value. $\lambda=(R/R_1)(R_{21}/R_{23})^{1/2}$ in which $R_1$ is any leakage resistance across a capacitor 29, 36.

The voltages in the differential equation are instantaneous values, and the equation holds for a value of time within the orthogonality interval. To determine the voltage at read out junction 32, the following relation is applicable:

$$e_{32}=-(R_{23}/R_{21})^{1/2}(\tau\dot{e}_{38}+\lambda e_{38})$$

The time constant $\tau$ is an indication of the speed of response of the circuit, or of the frequency for which it will detect the presence of sine and cosine pulses. Values for R and C are selected for the frequency response desired, so each detector circuit 2, 3, . . . *n* differs from the others in these parameters, so that each detects a pulse of a separate frequency.

Fine adjustment of frequency response is obtained by varying the timing resistor 21, and the amplitude of the voltage output is controlled by varying the amplitude resistor 19. Hence, the circuit of the invention is easily adjusted, and it is comprised of standard resistance, capacitance and amplifier components that are reliable and compact. Each detection circuit 2, 3 . . . *n* also serves as a detector for both sine and cosine functions of the same frequency, so that each such circuit detects two items of information. The circuit has high resolution and achieves detection of orthogonal sine and cosine pulses in a manner that makes this method of information transmission practical.

In the foregoing description of the invention, each sine and cosine pulse had either a positive or a negative amplitude to represent one or the other of the binary members. It is also possible to assign more than two values to the amplitudes of the sine and cosine pulses, e.g., +1, +⅓, −⅓ or −1 rather than only +1 or −1. The circuit of FIG. 3 will detect these variations in amplitude by the voltages at the read out junctions 32 and 38 varying accordingly. Hence, the circuit of the invention provides for detection of variations in amplitude as well as amplitude reversal of orthogonal sine and cosine pulses.

We claim:

1. In a circuit for detecting periodic functions the combination comprising:

an input connected to receive orthogonal sine and cosine pulses;

a feedback line;

an electronic adder having an amplifier, an amplitude resistor joining said input connection to the amplifier, a tuning resistor joining said feedback line to the amplifier, and a resistance bridging the amplifier;

a first electronic integrator connected to the output of said electronic adder having a second amplifier, a time constant resistor at the input of said second amplifier, a capacitor across the second amplifier, a clearing switch across the capacitor, and a first read out junction at the output of said second amplifier;

a second electronic integrator connected to said first read out junction having a third amplifier, a second time constant resistor at the input of said third amplifier, a second capacitor across said third amplifier, a clearing switch across said second capacitor, and a second read out junction at the output of said third amplifier;

said feedback line being joined to said second read out junction for feeding a signal back to said electronic adder;

a read out switch joined to said first read out junction;

a second read out switch joined to said second read out junction, said first and second read out switches are connected to periodically conduct in synchronism with the periodic functions being detected; and said clearing switches are connected to conduct periodically in synchronism with the periodic functions being detected.

2. A circuit in accordance with claim 1, in which several such detection circuits are provided for detection of different frequencies and there is in combination therewith a pulse generator that operates the switches of the detection circuits for clearing the same in synchronism with functions being detected.

3. A circuit in accordance with claim 1, in which several such detection circuits are provided for detection of different frequencies and there is in combination therewith a sample pulse generator that produces a pulse for causing said first and second read out switches to conduct in synchronism with the periodic functions being detected.

4. In a circuit for receiving and detecting orthogonal functions transmitted in pulses the combination comprising:

a first integrating circuit tuned for the frequency of the functions to be detected;

a second integrating circuit joined to the output of the first integrating circuit that is tuned for the frequency of the functions to be detected;

a feedback from said second integrating circuit to the first integrating circuit;

a signal input joined to the circuit that introduces orthogonal functions to be detected;

a read out junction for at least one of said integrating circuits;

a read out switch joined with said read out junction;

a sample pulse generator joined with said read out switch that periodically operates said read out switch to detect the associated integrating circuit condition in synchronism with the orthogonal functions to be detected;

clearing switches joined with said integrating circuits; and a reset pulse generator joined with said clearing switches that periodically operates said switches to clear the integrating circuits in synchronism with the orthogonal functions to be detected and with the operation of said read out switch.

5. In a circuit for detecting periodic functions the combination comprising:

an operational amplifier having its input connected to operate as an inverter and having a feedback resistance bridging its input and output;

a first electronic integrator connected to the output of said operational amplifier having a second amplifier, a resistor at the input of said second amplifier, a capacitor across the second amplifier, and a clearing switch across the capacitor;

a second electronic integrator connected to the output of said first integrator, a third amplifier, a resistor at the input of said third amplifier, a second capacitor across said third amplifier, and a second clearing switch across said second capacitor;

a feedback line from the output of said second integrator to said operational amplifier;

an input for feeding a signal to the circuit;

an output lead from one of said electronic integrators;

a lead out switch joined to the output lead;

a sample pulse generator that produces a pulse for causing said switch to conduct a read out signal in synchronism with the periodic functions being detected; and a reset pulse generator for operating said clearing switches after reading out a signal from said output lead

References Cited

UNITED STATES PATENTS

| | | | |
|---|---|---|---|
| 2,835,882 | 5/1958 | Beek et al. | 340—174.1 |
| 2,983,880 | 5/1961 | McFadden | 328—127 |
| 3,013,160 | 12/1961 | Reiner | 328—127 |
| 3,281,694 | 10/1966 | Clark | 307—210 |
| 3,333,092 | 7/1967 | Hauser | 328—127 |
| 3,411,093 | 11/1968 | Gaylor | 328—14 |
| 3,368,036 | 2/1968 | Carter | 328—133 |
| 3,369,185 | 2/1968 | Carter | 328—67 |

DONALD D. FORRER, Primary Examiner

H. A. DIXON, Assistant Examiner

U.S. Cl. X.R.

307—229, 210, 232, 251; 308—151; 328—127